Dec. 26, 1950    S. SKOLNIK    2,535,374
CALCULATOR
Filed June 15, 1946    4 Sheets-Sheet 1

INVENTOR
Samuel Skolnik
BY
John Flam
ATTORNEY

Dec. 26, 1950     S. SKOLNIK     2,535,374
CALCULATOR

Filed June 15, 1946     4 Sheets-Sheet 2

INVENTOR
Samuel Skolnik
BY John Flann
ATTORNEY

Dec. 26, 1950 S. SKOLNIK 2,535,374
CALCULATOR
Filed June 15, 1946 4 Sheets-Sheet 3
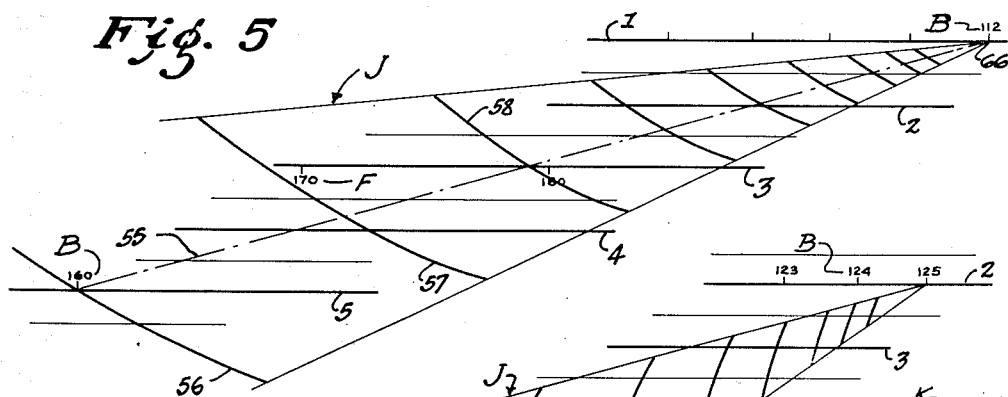
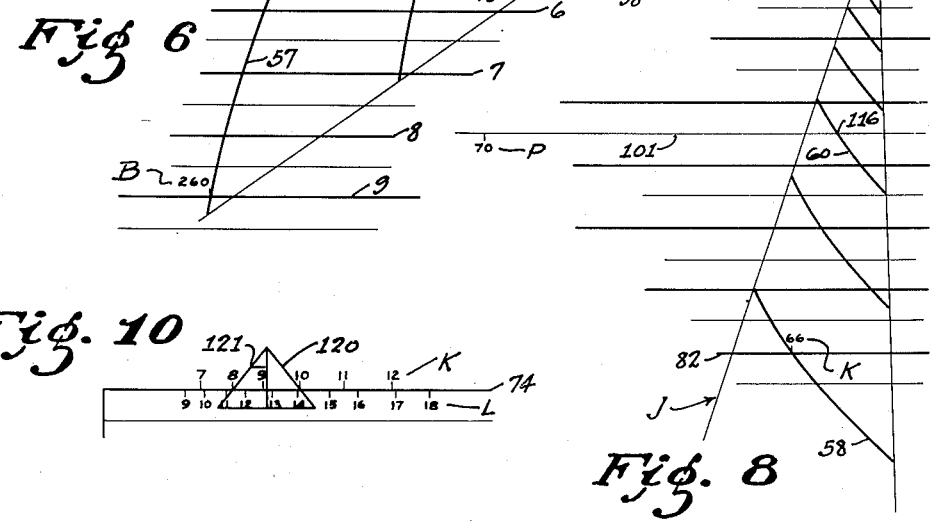
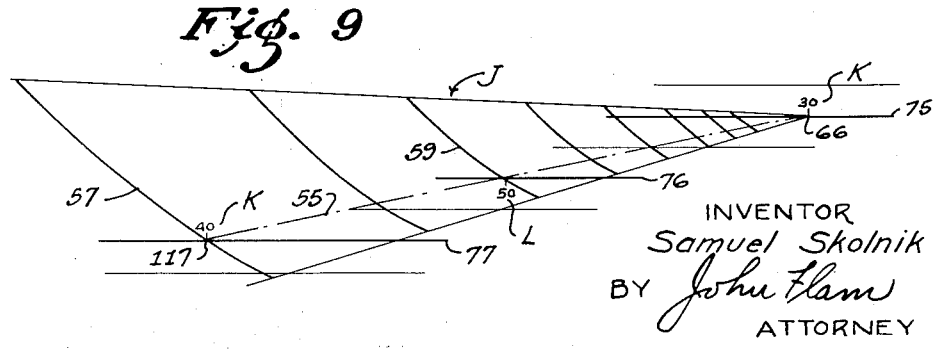
INVENTOR
Samuel Skolnik
BY John Flam
ATTORNEY Dec. 26, 1950  S. SKOLNIK  2,535,374
CALCULATOR
Filed June 15, 1946  4 Sheets-Sheet 4

INVENTOR
Samuel Skolnik
BY John Elam
ATTORNEY

Patented Dec. 26, 1950

2,535,374

UNITED STATES PATENT OFFICE 2,535,374

CALCULATOR

Samuel Skolnik, Los Angeles, Calif.

Application June 15, 1946, Serial No. 676,871

6 Claims. (Cl. 235—61)

This invention relates to a calculating device.

In an ordinary Mannheim-type slide rule, the C and D scales usually used for multiplication and division carry marks subdivided from 1 to 10. The numbers correspond, in these scales, to the lengths of the logarithms of the numbers.

Physical addition and subtraction of scale lengths thus provides a method of multiplication and division. It is not practical to use a scale length of more than about a foot. Therefore, the degree of accuracy, depending often on interpolation, does not exceed three significant figures.

It is one of the objects of this invention to make it possible to use long scales in a relatively compact manner, and thereby to obtain accuracy corresponding to at least four significant figures.

In order to accomplish this result, sections of a logarithmic scale, disposed in a convenient manner, as on a chart, are provided, and which, with a pointer, can be used to multiply or divide. In this arrangement there is no need to provide relatively movable scales; instead, only a pointer joining two of the factors is required.

In the operations involving these sectional scales, an index line may be used, connecting two points on the scale and corresponding to the factors of the computation. At times, such a line may make a small angle with the scale, rendering reading the scales difficult and inaccurate. It is another object of this invention to provide a substitute for such a line in which the angle of the line with respect to the scale is always sufficiently great to preclude any material error of observation; for example, the minimum angle of intersection can be readily made as large as 45°.

The provision of sectional scales utilized in this manner is useful for calculations other than multiplication or division. As another example, sectional scales, appropriately subdivided and indexed, may be used to solve problems involving the square root of the sum of the squares of numbers. Thus given two of the three sides of a right triangle, the third side can be expeditiously obtained.

It is, accordingly, another object of this invention to provide a device that can be used to solve for any of the three numbers in the relation $$C = \sqrt{A^2 + B^2}$$

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figs. 5 and 6 are fragmentary enlarged views, illustrating the manner in which the pointer of Fig. 4 is utilized in connection with the chart of Fig. 1;

Figs. 8 and 9 are views, similar to Figs. 5 and 6, illustrating the manner in which the pointer of Fig. 4 may be used with the chart of Fig. 7; and Fig. 10 is a fragmentary view, illustrating another form of pointer used where the numbers involved lie close together on a single scale section.

Figure 1:
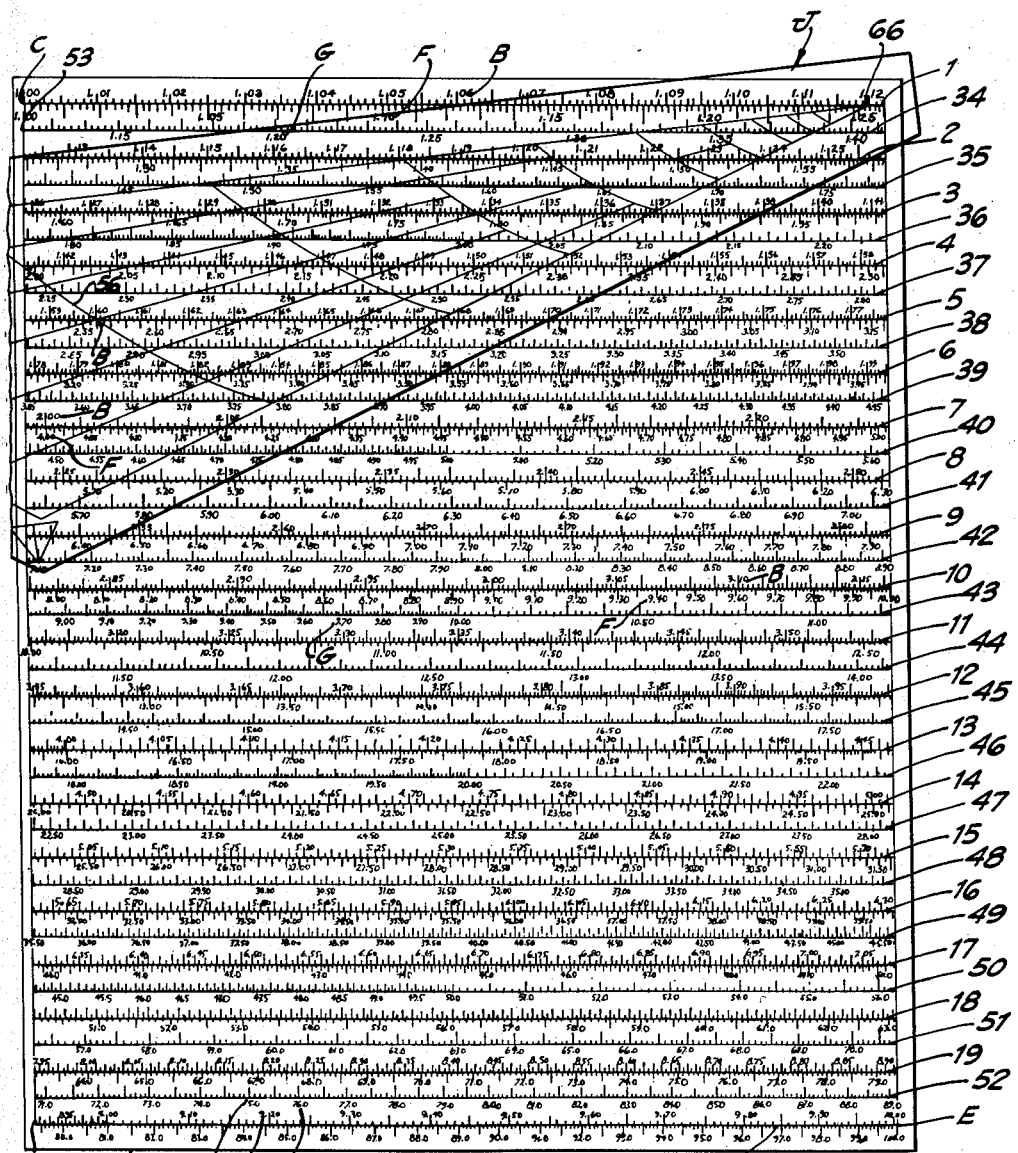
Figure 1 shows a chart incorporating the invention, utilized for multiplication and division.

The chart A of Fig. 1 is subdivided logarithmically. It includes twenty uniformly spaced scale sections 1 to 20 inclusive. These sections are all of uniform length, the left-hand ends of the scale falling upon a common straight line 21.

In the present instance, the twenty sections form a scale corresponding to logarithms of the numbers B, appearing at the scale divisions above the scale sections, the numbers corresponding to the logarithms of one to ten, or from 100 to 1000. In order to facilitate computations, the zero point C of the scale, corresponding to the left-hand end of scale section 1, is marked with the number 100. Accordingly, the end of the scale, corresponding to the right-hand end E of section 20, corresponds to the logarithm of ten or 1000. The numbers above the scale sections carry indicia using three significant figures. In this way, no numbers (except the number 1000 corresponding to point E) have more than three digits, whereby the scale numbers can be more readily identified. Since the decimal point in operations of multiplication and division, when using logarithmic scales, are quite easily determined, and only the digits are of significance, this omission or addition of zeros in no wise affects the use of the scales.

In this mode of division, the numbers B, marked on the scale above the sections 1 to 20 inclusive, correspond to the lengths of the logarithms of the numbers. Thus, the logarithm of the number 112 extends almost to the right-hand end of scale section 1, the space between the numbers decreasing as the scale progresses.

The scale sections 1 to 20 inclusive also carry other graduations F marked off below each scale section 1 to 20 inclusive. These lower numbers correspond to the square of the numbers B appearing immediately above the corresponding F graduations.

Thus, for example, in the scale section 7 the number 200 appears near the left-hand end of the scale line. Immediately under it is the number 400, corresponding to the square of 200, with two zeros omitted.

It is obvious that, in this manner, the twenty scale sections 1 to 20 inclusive correspond to a complete C or D scale of a conventional Mannheim slide rule. The overall length of the complete scale is much greater than could be obtained in a conventional slide rule, all of the sections being arranged compactly on a single chart A.

The scale sections 1 to 20 are marked in heavy lines on the chart, and can be used in a manner to be hereinafter described for multiplication or division.

In order to obtain the results of the multiplication or division of two numbers by the aid of this chart, use may be made of a pointer or index which may be in the form of a straight line.

Figure 2:
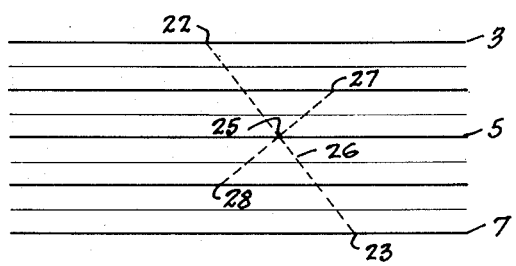
Figs. 2 and 3 are diagrams illustrating the principles of the invention.

Thus, for example, as shown in Fig. 2, the two numbers to be multiplied can be represented by the points 22 and 23 on the B scale. The point 22 may appear, for example, on scale section 3; and the point 23 on scale section 7; and these scale sections are separated by an even number of spaces, four in this instance. A straight line 26, joining these points, intersects the scale section 5 at the point 25, the scale section 5 being equidistant from the scale sections 3 and 7.

It can readily be shown that the point 25 corresponds to a scale division on the scale F below the section 5, representing the product of the two quantities corresponding to the points 22 and 23. This can be shown as follows: If we designate the number on the scale F at point 22 as $n_1$, and the number on the scale F at point 23 as $n_2$, and the number corresponding to point 25 as $n$, then $n$ is equal to $nr$, where $r$ corresponds to the length of the scale section lines between points 22 and 25, since addition of a logarithmic scale of length $r$ corresponds to multiplication. Also, $n$ is equal to $$\frac{n_2}{r}$$

since $r$ also corresponds to the difference in length between points $n_2$ and $n$. Multiplication of these two equalities yields:

$$n_1 n_2 = n^2$$

Accordingly, the square of $n$ read on scale F at point 25 is the correct result.

Obviously this relationship holds for all numbers that are joined by lines bisected at point 25, such for example, as indicated by points 27 and 28 of Fig. 2.

The inverse process of division can be carried out by setting the line 26 so that it passes through the product 25 on the scale F and also so that it passes through the divider such as the number corresponding to scale division 23. The answer is read off at point 22 on the upper scale divisions.

Figure 3:
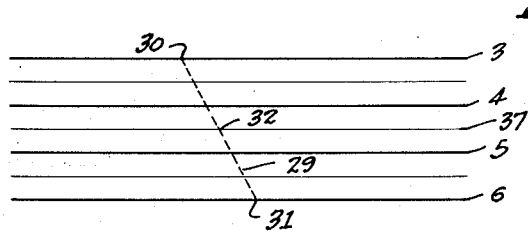

It may occur that the two factors do not lie on section lines that are spaced by an even number of spaces. Such a condition is represented in Fig. 3 where there are but three spaces between the top scale section 3 and the lower scale section 6. The two numbers to be multiplied, corresponding to the points 30 and 31, are read on the upper scale divisions B of these sections. In this case the center point 32 of line 29 is located between the scale sections 4 and 5. In order to be able to read this value, corresponding to the bisecting point 32, another set of scale sections, shown in light lines, is provided intermediate the main scale sections 1 to 20. These scale lines are marked by reference characters 34 to 52 inclusive on Fig. 1. Of course, the two sets of scale sections 1 to 20, and 34 to 52 inclusive, can be formed by lines of contrasting colors, or in some other way readily to distinguish them. In this instance the intermediate scale section lines are shown as much lighter in weight than the main section lines.

The scale G on sections 34 to 52 corresponds to scale F in the following manner. The left-hand end 53 of the first intermediate scale 34 corresponds to the center of the scale F immediately above it; and, from this point 53, scale G follows the same as the scale F.

It may readily be shown that the correct product can be read on the scale division G of the intermediate scale in the event the center of the line 29 (Fig. 3) falls on one of the intermediate scale sections, such as 37. The scale division on scale G at the point 32 gives the proper product for the numbers corresponding to the points 30 and 31. This can readily be demonstrated in a manner similar to that set forth with respect to Fig. 2.

The process of division for cases such as in Fig. 3 is accomplished as before. The line 29 is caused to pass through point 32. The divider may correspond to the point 30 or point 31. The result can be read at point 31 or 30 upon the upper scale divisions 6 or 3.

The scales can obviously also be used for obtaining the product of the square roots of numbers, or the products of the square root of one number and another number, or the quotient of the square of a number and another number, or the quotient of the squares of two numbers.

It is also possible, by the aid of additional indicia, to obtain results of formulae generally that utilize two factors to be multiplied, as this involves merely a matter of indexing.

In the event line 26 or 29 makes a small angle with the scale sections, the accuracy of reading the scale divisions may be reduced.

Figure 4:
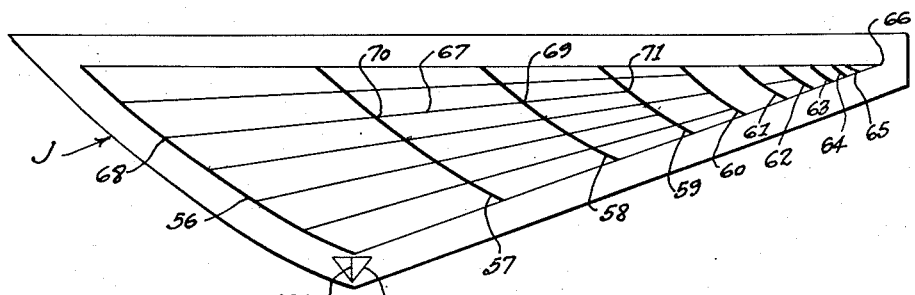
Fig. 4 is a view of a pointer or index adapted to be used with the chart of Fig. 1.

It is possible to ensure that the scale divisions can be determined more accurately by providing a pointer or index in which the angle of intersection with the scale line is always considerable. For this purpose, a pointer or index J (Figs. 1 and 4) is provided, preferably formed of thin transparent material such as Celluloid or tracing cloth. It carries a series of curves 55 to 65 inclusive.

The pointer J has an index point 66 so arranged that any line, such as 67, drawn from the point 66 will intersect the curves 55 to 65 inclusive at a conveniently large angle, such as near 45°.

Assuming that a line 67 is drawn between point 66 so as to end on the outermost curve 56, the curves are so arranged that the segment 66—68 of line 67 is bisected at the point 69, corresponding to the intersection of the line 67 on the curve 58, the next but one to curve 56. Similarly, the segment 66—70 is bisected at the point 71 on curve 59, the next but one to curve 57, on which point 70 falls.

In other words, any segment beginning at point 66 and ending on one of the curves 56 to 65 is bisected on that curve of the series which is the second from the end of the segment.

The curves 56 to 65 form a constant angle with any line 67 drawn from point 66, such as 45°. Accordingly, these curves obey the equation:

$$r = \frac{C}{e^{\frac{\theta}{\tan \alpha}}}$$

where $r$ and $\theta$ are the polar coordinates of any points on the curve, $C$ is a constant for each curve, $\alpha$ is the angle of intersection of the curve with the line 67, and $e$ is the natural base of logarithms. The constant $C$ is chosen for each successive curve 56 to 65 so as to provide the bisecting relation hereinabove mentioned. When $\alpha$ is 45°, as indicated herein, the form of the equation is simplified, for then $\tan \alpha$ equals 1. Further, each of the curved portions 56 to 65 are long enough so that the shortest radius of each of the curved portions is at least as long as the longest radius of the next smaller curve. In this way, it is assured that all lengths can be measured continuously within the limits of the pointer.

The use of the index J is illustrated in Fig. 5. In this case the number 112, appearing on scale section 1, is to be multiplied with the number 160 appearing on scale section 5. The point 66 is placed on the scale division 112, and the index J is then moved about division 112 until one of the curves 56 to 65 inclusive intersects the scale division corresponding to 160 on section 5. Then, since there are an even number of spaces between the scale section 1 and the scale section 5, the answer is read off by the aid of curve 58 (the second from curve 56) where it intersects the scale section 3; and this answer is read off on the lower scale divisions F of scale section 3.

So long as the radius vector line 55 makes but a small angle with the scale lines 1 to 20, the intersections of the curves with these scale lines is in the neighborhood of 45°, and an accurate reading can be obtained. Where the angle between the radius vector, such as 55, and the scale lines approaches 45°, it is advisable to reverse the index member J in order to obtain a sufficiently larger angle of intersection between the scale lines and the curves 56 to 65. Such a situation is actually present in Fig. 5; and Fig. 6 illustrates a manner of use of the member J to obtain a larger angle of intersection. To ensure accuracy and reduce parallax, the member J can carry the curves and other marks on both sides thereof.

In the instance shown in Fig. 6, the number 125, appearing on scale section 2, is to be multiplied with the number 260 appearing on scale section 9. Since there are an odd number of spaces between scale sections 2 and 9, an auxiliary scale section 38, shown in light lines, is used to read off the answer on scale G at the intersection 73 of curve 59 with section 38.

Due to the fact that the length of the complete scale in the form of Fig. 1 is quite large, the answer can be read off easily to four figure places.

Figure 7:
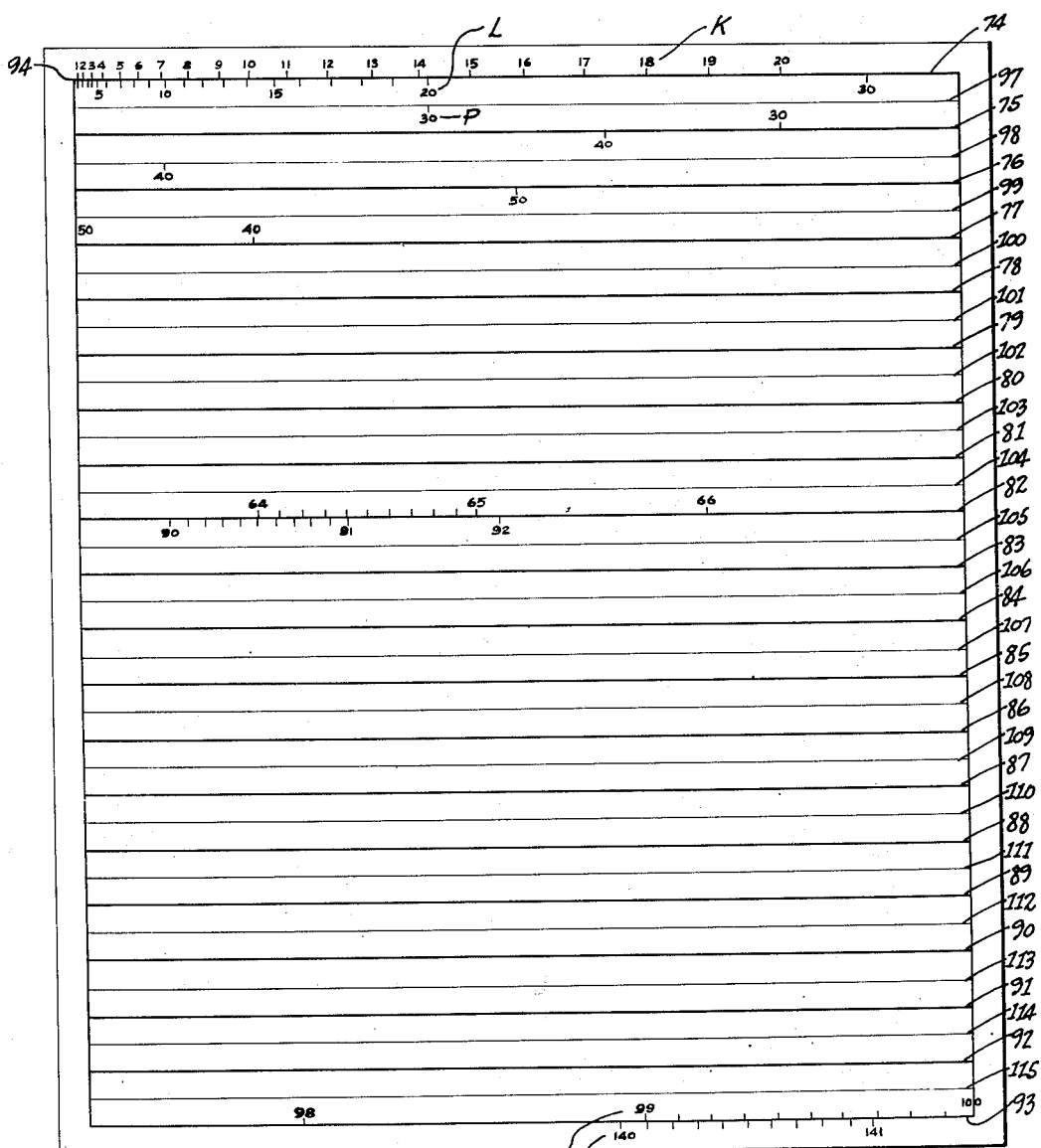
Fig. 7 shows a chart adapted to be used to obtain square roots of the sums of squares of two numbers, or the square roots of the difference of the squares of two numbers, many of the scale divisions being omitted.

The chart M of Fig. 7 is provided for the solution of problems involving three numbers of the form $$C = \sqrt{A^2 + B^2}$$

In this instance, there are again twenty main scale sections, 74 to 93 inclusive. In this instance, the scale section subdivisions K, above the scale lines, correspond with the lengths of the squares of the numbers. Thus, the distance from the left-hand end 94 of the first scale section 74 to any number, such as 17, corresponds to a distance representing the square of the number. Here, again, the numbers from 1 to 100 are accommodated by the twenty scale sections 74 to 93.

The lower scale divisions L here correspond to numbers equal to the square root of 2 times the numbers appearing on the upper scale divisions K.

Auxiliary scale sections 97 to 115 inclusive are evenly spaced between the main scale sections. They carry similar subdivisions, but, as before, the left-hand ends of each of these scale sections correspond to the scale division at the center of the main scale section immediately above it.

It may be readily demonstrated that the square root of the sum of the squares of two numbers can be obtained by the use of the index member J as before. Thus, for example, in Fig. 8 the square root of the sum of the squares of the numbers 30 and 66 is desired. The number 30 appears on the main scale line 75, and the number 66 appears on the main scale line 82. The point 66 of the index member J is placed on the numeral 30 and one of the curves, such as 58, falls on the scale division corresponding to 66 on scale line 82. Since there is an odd number of spaces between scale lines 75 and 82, the answer can be read on the scale P of the auxiliary scale section 101, corresponding to the point 116 where curve 60 intersects section 101. Here, as in the case of Fig. 6, the index is inverted to provide intersections making large angles between the curves and the scale lines.

In Fig. 9, the application of the chart M is indicated when an even number of spaces separates the scale sections on which the numbers appear. Thus, in this case, the square root of the sum of the squares of 30 and 40 is required. In this instance, the pointer or index member J is placed so that the point 66 falls on the number 30 on scale line 75. One of the curves, such as 57, is then caused to intersect a scale line at a division 117 corresponding to the number 40. This appears on scale section 77. The answer is read on the intermediate scale section 76, the lower scale subdivision L thereon corresponding to the number 50. Here, since the radius vector 55 to point 40 of curve 57 makes a small angle with the section lines, the index J is used in uninverted position.

The reverse process of finding the square root of the differences of squares of two numbers may obviously also be readily accomplished by this method. The method is quite general.

In the event the two numbers to be treated fall upon the same scale section, the index J can be used to bisect the distance between these two values.

Furthermore, in the event the two numbers happen to fall close together on the same scale section a different kind of pointer may be used. Thus, in Fig. 10, scale section 74 of the chart M of Fig. 7 is shown. In this case it is desired to find the square root of the sum of the squares of 8 and 10. The member J carries an isosceles triangle 120 in which is also drawn the altitude 121. This line 121 obviously bisects any line drawn parallel to the base of the triangle.

Accordingly, as shown in Fig. 10, this isosceles triangle may be placed so that its two legs fall respectively on the scale sections corresponding to the numbers 8 and 10, the base of the triangle being held parallel to the scale section 74. The altitude line 121 then bisects the distance between 8 and 10, and the answer can be read on the lower scale L. This answer is 12.8.

In the forms of the charts shown in Figs. 1 and 7, the numbers carried by the lower subdivisions F and L are respectively related to the numbers carried by the upper subdivisions B and K, respectively, by a constant exponent; e. g., the exponent 2 in the form of Fig. 1, since the lower numbers are squares of the upper numbers.

The inventor claims:

1. A pointer formed of translucent material, having a series of spaced curves thereon, as well as an index point, said curves being such that any straight line drawn from the point intersects all of the curves, and is divided proportionately by said intersections, the length of any straight line to any intersection on any curve being bisected by that curve which is two spaces nearer the point than said intersection.

2. A pointer formed of translucent material, having a series of spaced curves thereon, as well as an index point, said curves being such that any straight line drawn from the point intersects all of the curves, and is divided proportionately by said intersections, said curves corresponding in polar coordinates to the form $$r = \frac{C}{e^{\frac{\theta}{\tan \alpha}}}$$

where $r$ and $\theta$ are the polar coordinates of any intersection; $\alpha$ is the angle made by the curve with the straight line; $C$ is a constant; and $e$ is the base of natural logarithms.

3. A pointer formed of translucent material, having a series of spaced curves thereon, as well as an index point, said curves being such that any straight line drawn from the point intersects all of the curves, and is divided proportionately by said intersections, the length of any straight line to any intersection on any curve being bisected by that curve which is two spaces nearer the point than said intersection, said curves corresponding in polar coordinates to the form $$r = \frac{C}{e^{\frac{\theta}{\tan \alpha}}}$$

where $r$ and $\theta$ are the polar coordinates of any intersection; $\alpha$ is the angle made by the curve with the straight line; $C$ is a constant; and $e$ is the base of natural logarithms.

4. A chart having a plurality of sectional, uniformly spaced parallel scale lines of equal lengths, the ends of the lines falling on a common straight line perpendicular to the parallel scale lines; there being two sets of scale divisions for each line, the first of said scale divisions having numbered spacings in a definite ascending series, the successive scale sections forming a continuous uninterrupted scale; the other of said scale divisions having numbered spacings related to the first scale divisions by a constant exponent; there being another set of sectional scale lines equally spaced between the lines of the first set and similarly subdivided, the beginning point of the first scale section of said second set corresponding to the center of the first sectional line of the first set, and indexed in accordance with said other scale divisions; and a pointer member having a point of origin and spaced lines for dividing a line segment into equal parts, the origin and the pointer lines being adapted to overlie selected scale divisions.

5. A chart having a plurality of sectional, uniformly spaced parallel scale lines of equal lengths, the ends of the lines falling on a common straight line perpendicular to the parallel scale lines; there being two sets of scale divisions for each line, the first of said scale divisions having numbered spacings corresponding in length from the beginning of the first line to the logarithm of the number; the successive scale sections forming a continuous uninterrupted logarithmic scale; the other of said scale divisions having numbered logarithmic scale lines, the numbers thereon corresponding to the squares of the numbers of the first scale divisions; there being another set of sectional scale lines equally spaced between the lines of the first set and subdivided and numbered in accordance with said other scale divisions, the beginning point of the first scale section of said second set corresponding to the center of the first sectional line of the first set; and a pointer member having a point of origin and a series of spaced curves forming a constant angle with any line drawn from the origin, the alternate curves dividing a line from the origin into equal parts, the origin and the pointer lines being adapted to overlie selected scale divisions.

6. A chart having a plurality of sectional, uniformly spaced parallel scale lines of equal lengths, the ends of the lines falling on a common straight line perpendicular to the parallel scale lines; there being two sets of scale divisions for each line, the first of said scale divisions having numbered spacings corresponding in length from the beginning of the first line to the square of the number; the successive scale sections forming a continuous uninterrupted scale; the other of said scale divisions having numbered scale lines, the numbers thereon corresponding to the square root of two times the numbers on the first scale divisions; and a pointer member having a point of origin and a series of spaced curves forming a constant angle with any line drawn from the origin, the alternate curves dividing a line from the origin into equal parts, the origin and the pointer lines being adapted to overlie selected scale divisions.

SAMUEL SKOLNIK.

REFERENCES CITED

The following references are of record in the file of this patent:

UNITED STATES PATENTS

| Number | Name | Date |
|---|---|---|
| 802,344 | Wilkes | Oct. 17, 1905 |
| 1,484,176 | Haimes | Feb. 19, 1926 |
| 1,610,706 | Ragot et al. | Dec. 14, 1926 |
| 1,632,505 | Ritow | June 14, 1927 |
| 2,075,854 | Karnes | Apr. 6, 1937 |
| 2,232,319 | Gay | Feb. 18, 1941 |

FOREIGN PATENTS

| Number | Country | Date |
|---|---|---|
| 3,685 | Great Britain | Feb. 14, 1907 |

OTHER REFERENCES

Pages 6, 45, 47 and 132 of "Graphical and Mechanical Computation" by Joseph Lipka, published by John Wiley and Sons, Inc., N. Y., 1918.